(No Model.)
G. G. HUNT.
HARVESTER REEL.
No. 366,004. Patented July 5, 1887.
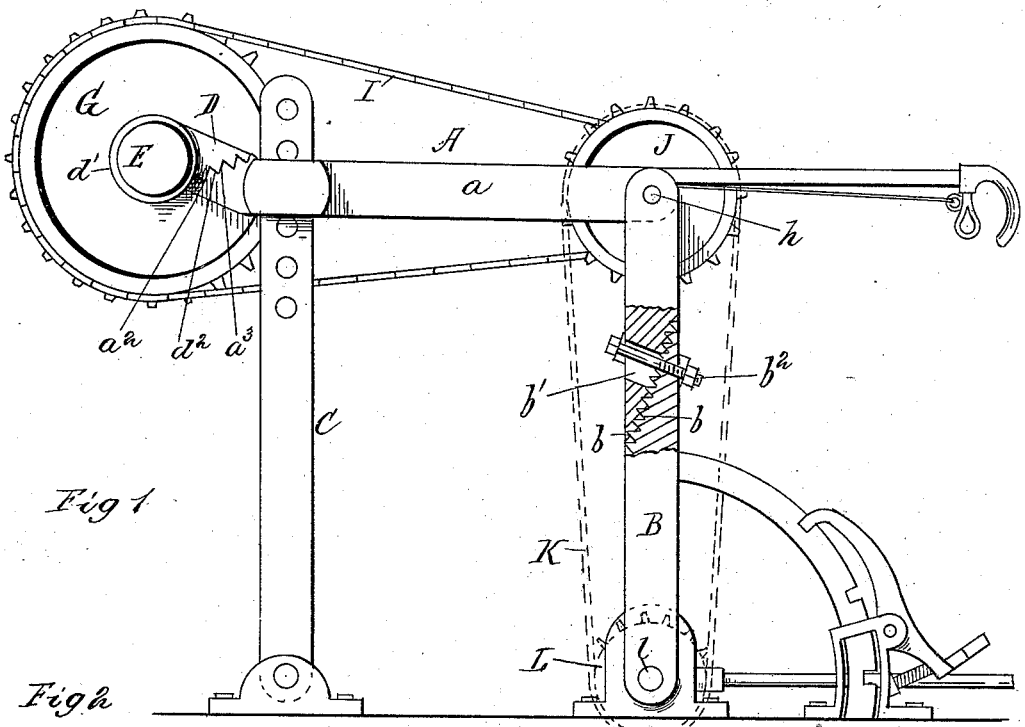
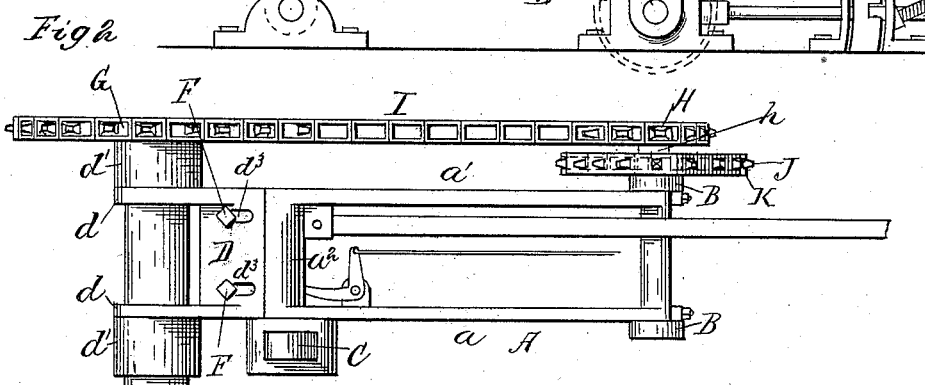
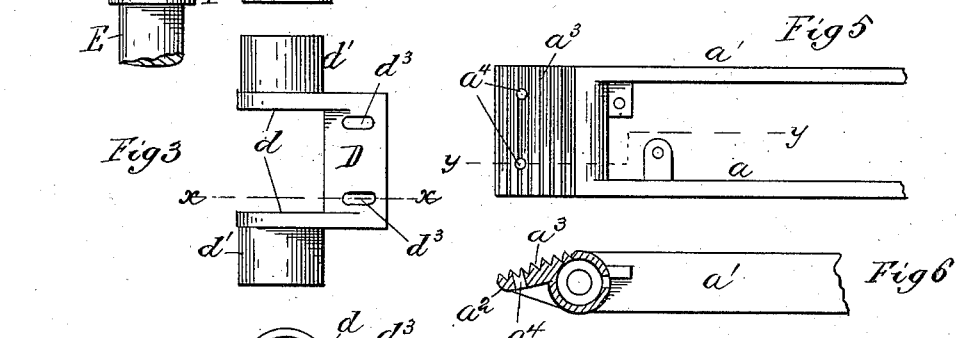
Witnesses
W. C. Corliss
Irvine Miller
Inventor
George G. Hunt
By Coburn & Thacher
Attorneys 000
United States Patent Office.

GEORGE G. HUNT, OF BRISTOL, ASSIGNOR OF ONE-HALF TO THE PLANO MANUFACTURING COMPANY, OF PLANO, ILLINOIS.

HARVESTER-REEL.

SPECIFICATION forming part of Letters Patent No. 366,004, dated July 5, 1887.

Application filed October 5, 1885. Serial No. 179,089. (No model.)

*To all whom it may concern:*

Be it known that I, GEORGE G. HUNT, a citizen of the United States, residing at Bristol, in the county of Kendall and State of Illinois, have invented certain new and useful Improvements in Harvester-Reels, which are fully set forth and described in the annexed specification, reference being had to the accompanying drawings, in which—

Figure 1 represents a side elevation of a reel-shaft and its supports embodying my improvement; Fig. 2, a plan view of the same; Fig. 3, a plan view of the reel-shaft journal-bracket detached; Fig. 4, a cross-section of the same, taken on the line $x$ $x$, Fig. 3; Fig. 5, a plan view of the supporting-arm on which the journal-bracket is mounted; and Fig. 6, a cross-section of the same, taken on the line $y$ $y$, Fig. 5.

My invention relates to reels for harvesting-machines, and pertains particularly to devices whereby an adjustment may be effected to keep the drive-chain taut.

I will proceed to describe in detail one way in which I have carried out my invention in practical form, and will then point out definitely in the claims the special improvements which I believe to be new and wish to protect by Letters Patent.

In its general features the reel and its supporting and driving devices are like the structure described and shown in Letters Patent No. 286,304, granted to me October 9, 1883, and the present invention may be construed as an improvement upon the structure shown in said Letters Patent, to which reference is made for description of parts not mentioned herein.

In the drawings, A represents the reel-supporting arm or frame. This part is preferably made of metal cast in one piece, and is composed of two side branches, $a$ $a'$, joined at the forward ends by a bracket-head, $a^2$, the upper face of which is beveled and this bevel provided with longitudinal serrations $a^3$. This piece takes the place of the "supporting-frame M" in my prior patent mentioned above, but is much narrower than said frame. It is pivoted at its rear end to a swinging supporting-post, B, and at its forward end to a similar post, C, in substantially the same manner as described and shown in my Patent No. 286,304. A journal-bracket, D, is constructed with branches $d$, extending out from the body of the bracket, but parallel to each other and provided with sleeves $d'$, which form the journal-boxes for the reel-shaft E. The under side of the body of the bracket is provided with serrations $d^2$, like those on the supporting-bracket already described, and there are two short slots, $d^3$, cut transversely through the body of the bracket, which is preferably cast in one piece with the sleeve-journals. This journal-bracket is mounted upon the supporting-bracket, the serrated faces of the two parts engaging with each other, as shown in Fig. 1 of the drawings, and the two are fastened together by means of screw-bolts F, passing through the slots in the journal-bracket and holes $a^4$ in the supporting-bracket.

Obviously by loosening the bolts the journal-bracket may be adjusted on its support so as to set the reel-shaft forward or backward, and the two parts of the support fastened together again by tightening the bolts. A sprocket-wheel, G, is mounted on the end of the reel-shaft, and a similar wheel, H, is mounted on a shaft, $h$, which passes through the rear end of supporting-piece A and the upper end of the posts B, and a sprocket-chain, I, runs over the two wheels G and H, thereby communicating motion to the former when the latter is rotated. The shaft $h$ is also provided with a sprocket-wheel, J, fastened to it, to which a chain, K, is applied, that also runs over a sprocket-wheel, L, below the wheel J and mounted on a shaft, $l$, which passes through the lower end of the posts B. This shaft $l$ is driven in any usual way from the main gearing, and by its rotation will obviously communicate motion to the shaft $h$ and so to the reel-shaft. Now, it will be seen that the adjustment of the journal-bracket described above will adjust the reel-shaft with reference to the sprocket-wheel shaft $h$, and so will affect chain I by tightening or loosening it, according to the direction of the adjustment. This device, therefore, provides for keeping the reel drive-chain taut under all circumstances. The reel-support, as shown in the drawings, is secured to the front post, C, by the devices described and shown in Patent No. 286,304, whereby it is adjustable vertically on the post. This particular mechanism, however, constitutes no part of my present invention, and may be used or not, as desired.

I have described the reel-support A as preferably made of metal. It may be made of wood, if sufficiently strong, in which case, however, the bevel-face on the bracket-head should be shod with serrated metal.

It is also desirable, in order to secure regular driving of the reel, that the chain K shall also be kept taut when the driving devices here shown are employed. To accomplish this I also apply my improvement to the metal posts B, which support the wheel-shaft $h$. The posts are divided diagonally, as shown in Fig. 1 of the drawings, in which the side of the inner post is partially broken away to show the fastenings. Serrations $b$ are cut on the respective faces and a slot, $b'$, in one of the sections, through which the bolt $b^2$ passes, and also through the bolt-hole in the other section, thereby fastening the two together by a nut on the bolt.

It is obvious that by means of these serrated faces the upper post-section may be adjusted vertically to keep the chain K taut. Some other means may be employed for driving the shaft of the wheel H, in which case, of course, this adjustment last described may or may not be necessary, according to the nature of the mechanism used.

I do not wish to be understood as limiting myself in all particulars to the special features of construction herein described and shown, as mechanical changes may be made without materially modifying my invention.

Having thus described my invention, what I claim as new, and desire to secure by Letters Patent, is—

1. The reel-support A, composed of the side branches, $a\,a'$, and the bracket-head $a^2$, uniting the forward ends of the side pieces, in combination with an independent and separable reel-bracket applied directly to the said head, substantially as and for the purposes set forth.

2. The separate journal-bracket D, composed of a central body and branches, $d$, projecting therefrom, each of which branches is provided with a separate journal-sleeve, $d'$, in combination with a separate reel-carrying frame provided with a single head on which the central body of the bracket is seated and detachably secured thereto, substantially as and for the purposes specified.

3. The reel-driving shaft $h$, in combination with the supporting post or posts B, divided and serrated as specified, the sprocket-wheel J on the shaft $h$, the driving sprocket-wheel L, and the chain K, substantially as and for the purposes set forth.

4. The reel-support A, serrated as described, in combination with the serrated journal-bracket D, the reel-shaft E, the sprocket-wheels G H, the chain I, the divided posts B, serrated as described, the sprocket-wheels J and L, and the chain K, substantially as and for the purposes set forth.

GEORGE G. HUNT.

Witnesses:
   W. C. CORLIES,
   A. M. BEST.